United States Patent
Sarma

(10) Patent No.: US 12,122,682 B2
(45) Date of Patent: Oct. 22, 2024

(54) FORMS OF SODIUM NITRITE AND IMPURITY PROFILE THEREOF

(71) Applicant: DEEPAK NITRITE LIMITED, Gujarat (IN)

(72) Inventor: A S Sarma, Gujarat (IN)

(73) Assignee: DEEPAK NITRITE LIMITED, Vadodara (IN)

(*) Notice: Subject to any disclaimer, the term of this patent is extended or adjusted under 35 U.S.C. 154(b) by 0 days.

(21) Appl. No.: 18/619,187

(22) Filed: Mar. 28, 2024

(65) Prior Publication Data
US 2024/0239674 A1    Jul. 18, 2024

Related U.S. Application Data

(60) Division of application No. 18/051,881, filed on Nov. 2, 2022, now Pat. No. 11,981,579, which is a continuation of application No. PCT/IB2021/054748, filed on May 31, 2021.

(30) Foreign Application Priority Data

Jun. 1, 2020   (IN) .............................. 202021022914

(51) Int. Cl.
C01D 13/00    (2006.01)
C01B 21/50    (2006.01)

(52) U.S. Cl.
CPC ............. *C01D 13/00* (2013.01); *C01B 21/50* (2013.01); *C01P 2004/60* (2013.01); *C01P 2006/82* (2013.01)

(58) Field of Classification Search
None
See application file for complete search history.

(56) References Cited

U.S. PATENT DOCUMENTS 8,568,793 B2 * 10/2013 Sherman ................. A61P 11/00
423/385

* cited by examiner

*Primary Examiner* — Guinever S Gregorio

(57) ABSTRACT

A present disclosure describes about an improved form of purified crystalline sodium nitrite. The said form of sodium nitrite may comprise a purity level between 99% to 99.2%. The form of sodium nitrite may also comprise an amount of sodium nitrate no greater than 0.7%. The present disclosure also relates to a method of obtaining an improved form of purified crystalline sodium nitrite with minimum impurities.

9 Claims, No Drawings

FORMS OF SODIUM NITRITE AND IMPURITY PROFILE THEREOF

CROSS-REFERENCE TO RELATED APPLICATIONS AND PRIORITY

The present Application is a divisional application of U.S. non-provisional application Ser. No. 18/051,881 filed Nov. 2, 2022, which is a continuation application of PCT application No. PCT/IB2021/054748 filed on May 31, 2021 which further claims priority from Indian Patent Application No. 202021022914 filed on Jun. 1, 2020, each of which is incorporated herein by reference in its entirety.

TECHNICAL FIELD

The present disclosure described herein, in general, relates to an improved form of sodium nitrite. In particular, the present disclosure is related to a highly pure forms of sodium nitrite with minimum impurities and method of preparing an improved form of sodium nitrite.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Sodium nitrite ($NaNO_2$), an inorganic compound, is formed by reacting nitrogen oxides (NOx) with sodium carbonate or sodium hydroxide solution. Sodium nitrite (hereafter referred as SNI) is obtained as yellowish white crystalline solid. SNI is used in wide range of industrial applications including, but are not limited to, dyes and pigments, metal/water-heat treatment, specialty chemicals, rubber industry, food, fertilizers, in manufacture of glass surface, and pharmaceutical compositions. In industrial fields, different standards, and specification of sodium nitrite is desired especially as far as the purity and quality is concerned.

During the production process, sodium nitrate (SNA) is also produced along with sodium nitrite. Further, some unreacted residues of reactants like sodium carbonate and products such as sodium nitrate are left in the final product along with other impurities during the production process. Hence, a purified form of sodium nitrite is difficult to obtain and also important in view of its use in pharmaceutical industry. Further, sodium nitrate, produced in parallel to SNI, has side effects like heart disorders when consumed in higher amount. Therefore, any impurity or additional ingredient in sodium nitrite must be detected, quantified, and minimized in order to develop an improved form of sodium nitrite with minimal impurities should be prepared.

Moreover, handling crystals of sodium nitrite may be a tedious job due to lump formation and hygroscopic nature of the salt. These shortcomings should be resolved by modifying process, forms, size, properties, and shape of the sodium nitrite following a modified process of preparation and filtration. However, development of one or more forms complying with various standard requirement may lead to one or more process line and therefore does not remain cost effective.

Therefore, there is a long felt need for development of effective and economically cheaper method of preparation and an improved form of purified sodium nitrite (SNI).

SUMMARY

Before the present system and its components are described, it is to be understood that this disclosure is not limited to the particular system and its arrangement as described, as there can be multiple possible embodiments which are not expressly illustrated in the present disclosure. It is also to be understood that the terminology used in the description is for the purpose of describing the particular versions or embodiments only and is not intended to limit the scope of the present application.

This summary is provided to introduce concepts related to an improved form of purified sodium nitrite (SNI) and a method of production of a SNI with minimum impurities. This summary is not intended to identify essential features of the claimed subject matter nor it is intended for use in determining or limiting the scope of the disclosed subject matter. In one embodiment, an improved form of purified sodium nitrite is disclosed. The form of sodium nitrite may comprise a purity level between 99% to 99.2%. The form of sodium nitrite may also comprise an amount of sodium nitrate no greater than 0.7%. In another embodiment, a water content may be no greater than about 0.5% by weight, wherein a heavy metal content is no greater than about 15 ppm.

In yet another embodiment, the form of sodium nitrite may contain no greater than about than about 0.05% by weight of chloride content, wherein an iron content is no greater than about 0.002%, wherein a content of lead is no greater than 0.0001 ppm, wherein a content of Arsenic is no greater than 0.9 ppm, wherein a content of potassium is no greater than about 500 ppm, and wherein a content of mercury is no greater than 0.0001 ppm.

In yet another embodiment, the form of sodium nitrite may be free of heavy metals such as Mercury (Hg), Arsenic (As) and lead (Pb).

In yet another embodiment, the form of sodium nitrite may comprise an amount of chloride ion impurity no more than 0.0092%.

In yet another embodiment, the form of sodium nitrite may comprise an amount of ferric ion impurity no more than 0.001%.

In yet another embodiment, the form of sodium nitrite may comprise an amount of sulphate ion impurity no more than 0.032% and an amount of Fluoride impurity is no more than 1 ppm.

In yet another embodiment, the form of sodium nitrite may comprise an amount of sodium carbonate impurity is no greater than 0.1%.

In yet another embodiment, the form of sodium nitrite may comprise an amount of an anti-caking agent no greater than 0.1%.

In yet another embodiment, a shape of a sodium nitrite granule is optimized as purified crystalline granule and the height of a granule form is between 5 to 6 mm and a width of the granule form is between 7 to 8 mm.

In yet another embodiment, the form of sodium nitrite may comprise a content of Copper is no greater than 0.15 ppm, a content of Zinc is no greater than 0.2, a content of cadmium is no greater than 0.1 ppm, a content of chromium is no greater than 0.1 ppm, a content of chromium is no greater than 0.1 ppm, a content of Manganese is no greater than 0.11 ppm, and a content of Nickel is no greater than 0.1 ppm.

In another embodiment, a process of obtaining an improved form of purified crystalline of sodium nitrite with minimum impurities is disclosed. The process may comprise a step of mixing a predetermined ratio of air and ammonia in a venturi body mixer; transmitting the air-ammonia mixture through a HEPA filter for filtering out impurities and to obtain a purified air-ammonia mixture.

The process may comprise a step of transmitting the mixture of air-ammonia into the adiabatic burner to pass through a plurality of catalytic gauzes positioned as three pairs of two gauzes each at a predetermined temperature to carry out the selective oxidation process and to selectively obtain oxides of nitrogen.

The process may comprise a step of saturating oxides of nitrogen using a waste heat recovery boiler (WHRB) to obtain a saturated $NO_2$ gas.

The process may comprise a step of passing a saturated $NO_2$ gas through one or more absorption towers for absorbing the saturated $NO_2$ gas in one or more absorption towers containing an alkali medium for selective formation of sodium nitrite slurry.

The process may comprise a step of optimizing a concentration of sodium nitrite slurry using a crystallizer to obtain a crude crystalline form of SNI.

The process may comprise a step of re-crystallizing the crude crystalline form of SNI by multiple washing of the one or more solvents and more preferably water for removing the maximum impurities.

The process may comprise a step of obtaining the improved form of purified crystalline SNI with a purity level between 99% to 99.2%.

In yet another embodiment, the process may comprise a step of adding anti-caking agent to the crude crystalline form of SNI.

In one embodiment a modified sodium nitrite (SNI) may be obtained in one or more improved form of purified crystalline SNI such as uncoated form of SNI, and coated form of SNI, are disclosed herein.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

The words "comprising," "having," "containing," and "including," and other forms thereof, are intended to be equivalent in meaning and be open ended in that an item or items following any one of these words is not meant to be an exhaustive listing of such item or items or meant to be limited to only the listed item or items.

It must also be noted that, the singular forms "a," "an," and "the" include plural references unless the context clearly dictates otherwise. Although any methods similar or equivalent to those described herein can be used in the practice or testing of embodiments of the present disclosure, the exemplary methods are described. The disclosed embodiments are merely exemplary of the disclosure, which may be embodied in various forms.

Various modifications to the embodiment may be readily apparent to those skilled in the art and the generic principles herein may be applied to other embodiments. However, one of ordinary skill in the art may readily recognize that the present disclosure is not intended to be limited to the embodiments illustrated but is to be accorded the widest scope consistent with the principles and features described herein.

The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

The present disclosure solves a problem of formation of obtaining crude impure form of sodium nitrite (hereinafter interchangeably referred as 'SNI') by determining an improved form of purified crystalline SNI. The improved form of purified crystalline SNI is enabled for complying with the standards and obtained by using filters, i.e. specifically modified particulate air (PA) filters. The purified sodium nitrite crystals may be further modified in to one or more forms differing in shapes, purity level and complying with the standards required in the application fields.

In one embodiment, a crude form of SNI may be obtained by changing the ratio of oxides of nitrogen (NOx) gases and introducing the saturated $NO_2$ gas to the absorption tower comprising base slurries such as sodium carbonate or sodium hydroxide.

In one embodiment, an improved form of purified crystalline sodium nitrite (SNI) is obtained. The form of sodium nitrite may comprise a purity level between 99% to 99.2%. The form of sodium nitrite may comprise an amount of sodium nitrate impurity no greater than 0.7%. In one embodiment, a saturated $NO_2$ gas absorption from NOx gases enables reducing the amount of sodium nitrate content to less than 0.7%. Furthermore, it has been observed that a utilization of purified air-ammonia mixture for oxidation and to obtain oxides of nitrogen minimizes formation of impurities other than sodium nitrate at very primary stage of production of the improved crystalline form of SNI.

The improved form of purified crystalline SNI may comprise other impurities within a body tolerance limit and complying with standard requirements. The improved form of purified crystalline sodium nitrite may comprise impurities in trace amounts.

In another embodiment, a water content may be no greater than about 0.5% by weight, wherein the heavy metal content is no greater than about 15 ppm. In yet another embodiment, the form of sodium nitrite may contain no greater than about 0.05% by weight of chloride content, contain no greater than about 0.05% by weight of sulfate, contain no greater than about 0.002% by weight of iron, no greater than 0.0001 ppm of lead, no greater than 0.0001 ppm of Arsenic 0.9 ppm contain no greater than about 500 ppm of potassium, contain no greater than 0.0001 ppm of mercury and contain no greater than about 1 ppm of arsenic.

In one embodiment, the improved form of purified crystalline sodium nitrite is free of heavy metal such as Arsenic (As), Mercury (Hg), and lead (Pb). The heavy metal content in the sodium nitrite provided herein is determined according to Test-7 described in the examples.

It has been surprisingly observed that by following a process as described below the improved form of purified crystalline sodium nitrite comprise no trace amounts of heavy metal such as Arsenic (As), Mercury (Hg), and lead (Pb).

As the air-ammonia mixture is purified before oxidation and then a selective absorption of $NO_2$ gas in absorption tower to obtain a crude crystalline form of SNI, followed by recrystallization of a crude crystalline form of SNI using one or more solvents and more preferably water enabling formation of improved form of purified crystalline SNI with purity level greater than 99% and free of any trace amounts of harmful heavy metals.

In yet another embodiment, the form of sodium nitrite may comprise an amount of chloride ion impurity no more than 0.0092%. In certain embodiments, the amount of sodium nitrate in the sodium nitrite provided herein is determined by a spectrophotometry method as described in Test-5 below.

In yet another embodiment, the form of sodium nitrite may comprise an amount of chloride ion impurity no more than 0.0092%. In certain embodiments, the chloride content in the sodium nitrite provided herein is determined according to Method as described in Test-4 below.

In yet another embodiment, the form of sodium nitrite may comprise an amount of ferric ion impurity no more than 0.001%. In certain embodiments, the ferric ion content in the sodium nitrite provided herein is determined according to Method as described in Test-6 below.

In yet another embodiment, the form of sodium nitrite may comprise an amount of sulphate ion impurity no more than 0.032%, and an amount of Fluoride ion impurity is no more than 1 ppm. In certain embodiments, the sulphate ion content in the sodium nitrite provided herein is determined according to Method as described in standard protocols.

In yet another embodiment, the form of sodium nitrite may comprise an amount of sodium carbonate impurity is no greater than 0.1%. In certain embodiments, the sodium carbonate content in the sodium nitrite provided herein is determined according to Method as described in Test-3 below.

In yet another embodiment, the form of sodium nitrite may comprise a content of Copper is no greater than 0.15 ppm, a content of Zinc is no greater than 0.2, a content of cadmium is no greater than 0.1 ppm, a content of chromium is no greater than 0.1 ppm, a content of chromium is no greater than 0.1 ppm, a content of Manganese is no greater than 0.11 ppm, and a content of Nickel is no greater than 0.1 ppm.

In yet another embodiment, the form of sodium nitrite may be a coated form of sodium nitrite comprising an amount of an anti-caking agent no greater than 0.1%. The anticaking agent used for obtaining a coated improved form of purified crystalline SNI may be selected from but not limited to silicon dioxide, sodium silicate or sodium alkylnaphthalene sulfonate, calcium silicate.

In yet another embodiment, a shape of improved form of purified crystalline SNI may be optimized as a modified crystalline granule form and a height of the improved form of purified crystalline SNI is between 5 to 6 mm and the width of the crystalline granule form is between 7 to 8 mm.

In one embodiment, a suitable process to obtain the disclosed improved form of purified crystalline sodium nitrite with minimum impurities is provided in Indian Application No. 201921047080, filed on Nov. 19 2019 and titled "A venturi-air ammonia mixer enabled for burner system", an Indian Application No. 201921022338 filed on Jun. 5 2019 and titled as "A free flowing sodium nitrite and method of production", and an Indian Application No. 201921004836, filed on Feb. 7 2019, and titled as "Apparatus and process for conversion of ammonia into oxides of nitrogen" which are incorporated by reference herein in their entirety, as well as described in the process description set forth herein.

In one embodiment, a process of obtaining an improved form of purified crystalline sodium nitrite is disclosed. The process may comprise a step of mixing a predetermined ratio of air and ammonia in a venturi body mixer. The process may comprise transmitting an air ammonia mixture from the venturi body mixer through a HEPA filter for filtering out impurities. The step of transmitting the air ammonia mixture through a HEPA filter may enable filtering our smaller impurities with a particle size of at least 0.3 μm to obtain a purified air-ammonia mixture. The purification of air-ammonia mixture using HEPA filter reduces the impurity content of primary ingredient such as air-ammonia mixture in the modified SNI production process.

In one embodiment, utilization of purified air-ammonia mixture for oxidation and to obtain oxides of nitrogen minimizes formation impurities other than sodium nitrate at very primary stage of production of improved form of purified crystalline SNI.

The process may comprise a further step of introducing the purified air-ammonia mixture into the adiabatic burner at a temperature between 150° C.-170° C. The adiabatic burner is characterized by having a conical geometry and a ratio of internal diameter to cone length in the order of 5:6.

The process may further comprise transmitting the mixture of air-ammonia through a plurality of catalytic gauzes positioned as three pairs of two gauzes each at a temperature range between 850° C.-950° C. and a pressure between 1-4 bar to carry out the selective oxidation process and to selectively obtain oxides of nitrogen.

The process may further comprise a step of transferring the oxides of nitrogen to the waste heat recovery boiler (WHRB) to saturate and cool the oxides of nitrogen composition to a set temperature, wherein the temperature of the composition is reduced from 950° C. up to 200° C. The process may comprise passing a saturated oxides of nitrogen through one or more absorption towers and absorbing $NO_2$ gas in one or more absorption towers containing an alkali medium for selective formation of sodium nitrite slurry. In one embodiment, the process may comprise passing a saturated oxides of nitrogen through four absorption towers and absorbing $NO_2$ gas in the absorption towers containing an alkali medium for selective formation of sodium nitrite slurry.

In one embodiment, it has been surprisingly observed that by following a process as described below the improved form of purified crystalline sodium nitrite comprises no trace amounts of heavy metal such as Arsenic (As), Mercury (Hg), and lead (Pb). As the air-ammonia mixture is purified before oxidation and then a selective absorption of $NO_2$ gas in absorption tower to obtain a crude crystalline form of SNI followed by recrystallization of a crude crystalline form of SNI using one or more solvents and more preferably water enables formation of the improved form of purified crystalline SNI with purity level greater than 99% and free of any trace amounts of harmful heavy metals.

The process may comprise a further step of optimizing a concentration of sodium nitrite (SNI) slurry by heating the SNI slurry in a Crystallizer is carried out. In one embodiment, a temperature inside the Crystallizer comprising slurry mass of sodium nitrite is maintained to a predefined temperature between 85-90° C. under stirring at predefined stirrer speed and a predefined tip speed for a predefined period of time to obtain a concentrated SNI slurry mass.

The process may comprise gradually cooling of the SNI slurry mass up to a predefined temperature adjusted between 45° C.-40° C. and reducing stirrer speed to a predefined value after completing a cooling cycle. The process may comprise a step of evaporating a hot liquor from the SNI slurry mass to obtain pure solids of SNI. The process may comprise crystallizing the pure solids of SNI to obtain a crude crystalline form of SNI.

The process may also comprise an additional step of recrystallization of crude crystalline form of SNI by multiple washing of the crude crystalline form of SNI using one or more solvents and more preferably water for removing the impurities to obtain an optimized crystal form of SNI.

The process may also comprise a step of drying the crystal form of SNI for specific amount of time to obtain the modified form of sodium nitrite. The process may further comprise a step of breaking and crushing lumps of the modified form of sodium nitrite and sieving through a predefined mesh structure to obtain a uniform and improved form of purified crystalline sodium nitrite.

In yet another embodiment, the method may comprise a step of adding anti-caking agent to the crude crystalline form of SNI to obtain a coated improved form of purified crystalline of SNI.

In yet another embodiment, the alkali medium in the absorption towers is selected from at least one but not limited Sodium carbonate, and sodium hydroxide.

The improved form of purified crystalline sodium nitrite comprising one or more impurities may further be refined to obtain one or more different forms complying with shape, and purity and impurity standards such as: a purified form of SNI without an anti-caking agent (uncoated), a coated form of SNI with an anti-caking agent, in accordance with embodiments of the present disclosure.

EXAMPLES

Form-I

In one embodiment, an improved form of purified crystalline SNI without using anti-caking agent (uncoated SNI) is disclosed herein. Further, the uncoated SNI crystal may comprise an optimized improved form of purified crystalline granule without any sharp edges. Such form of SNI becomes easy to handle during handling and transportation and does not form lumps.

Form-II

In one embodiment, an improved form of purified crystalline SNI is a coated SNI with an anti-caking agent in an amount no greater than 0.09%. The coated SNI comprises anti-caking agent selected from, but not limited to, silicon dioxide, sodium silicate or sodium alkyl-naphthalene sulfonate, calcium silicate.

Example 1

Table 1 discloses a comparison of the impurity data of the uncoated improved form of purified crystalline SNI and an anti-caking agent coated improved form of purified crystalline SNI obtained by the method as described with the Indian standard grades of SNI in accordance with an embodiment of the present disclosure.

| Sr. No. | Test Parameter | Specification limit-I | An uncoated form of SNI in present disclosure | | A coated form of SNI in present disclosure | |
|---|---|---|---|---|---|---|
| | | | Min | Max | Min | Max |
| 1 | Appearance (% w/w min) | White or slightly yellowish crystalline powder | Slightly yellowish crystalline powder | | Slightly yellowish crystalline powder | |
| 2 | Purity (on dry basis) (% w/w max) | 99 | 99.00 | 99.10 | 99.05 | 99.10 |
| 3 | Loss of drying (% w/w max) | 0.50 | 0.11 | 0.15 | 0.12 | 0.14 |
| 4 | Alkalinity $Na_2CO_3$ (% w/w max) | 0.20 | 0.04 | 0.10 | 0.0.5 | 0.05 |
| 5 | Chloride as Cl (% w/w max) | 0.050 | 0.008 | 0.08 | 0.007 | 0.009 |
| 6 | Sodium nitrate (% w/w max) | 1.00 | 0.59 | 0.67 | 0.58 | 0.60 |
| 7 | Water insoluble (% w/w max) | 0.05 | 0.012 | 0.028 | 0.016 | 0.028 |
| 8 | Sulphate as $SO_4$ (% w/w max) | 0.05 | 0.026 | 0.032 | — | — |
| 9 | Iron as $Fe^{3+}$ (% w/w max) | 0.002 | 0.001 | 0.001 | 0.0007 | 0.0010 |
| 10 | Heavy metal as Hg, As, Pb (% w/w max) | 0.005 | 0.00 | 0.00 | 0.00 | 0.00 |
| 11 | Anti-caking agent | 0.2 | — | — | 0.05 | 0.09 |
| 12 | Clarity of 30% aqueous solution at 30° C. (% w/w max) | Clear solution | Clear solution | Clear solution | Clear solution | Clear solution |

Test-1: Purity Testing Method of Sodium Nitrite

In one embodiment, a purity of all forms Sodium nitrite in Table 1 was tested using a following method:

An amount of 3.16 gm $KMnO_4$ was dissolved in 100 ml D M water. The solution of $KMnO_4$ were then digested over a hot plate for one hour. The $KMnO_4$ solution was cooled filtered through Grade 4 sintered glass funnel without applying vacuum for 24 hours. After 24 hours $KMnO_4$ solution was diluted 1000 ml by demineralized water (DM) water. The solution was standardized same for exact normality of 0.1N. An accurately about 1.0 gm dry sodium nitrite test sample (2.0 to 3.0 gm for liquid) was taken and diluted to 250 ml volumetric flask by Distilled water. A 20 ml of 0.1 N $KMnO_4$ were taken in solutions in 250 ml beaker and 5 ml of concentrated $H_2SO_4$ in 50 ml Dist. Water were added. The temperature was maintained to about 40° C. and titration was performed by $NaNO_2$ solution from Burette, keeping the tip of the burette under the surface of $KMnO_4$ solution with continuous stirring. NaNO$_2$ solution were added very slowly. The end point was observed as pink to colourless. and the Burette reading (BR) was noted to obtain results in the Table. 1.

% of sodium nitrite in the dry of sodium nitrite test sample was calculated as below:

$$\% \ w/w \ \text{sodium nitrite} = \frac{\text{Normality of KMnO4} \times 34.5 \times 100 \times 250 \times 20}{\text{Gram sample} \times 1000 \times B.R.}$$

Test-2: Loss on Drying (LOD) of Sodium Nitrite

In one embodiment, an amount of loss on drying of all forms Sodium nitrite in Table 1 was tested using a Mettler Toledo Halogen Moisture Analyzer Model-HG-53 and by following method: Following protocol was followed to test the LOD: Start the instrument, pre-heat the empty aluminium pan (foil) at temp+/−100° C. for five minutes. Then take the quantity mansion in bellow table. Set the temperature & time as mentioned in below table. Press Start key and observe the final reading directly as % loss on drying.

| Sample | Sample quantity | Temp ° C. +/− 2° C. | Time Minutes |
|---|---|---|---|
| NaNO$_2$ samples of Table 1 | 5 gm | 110 | 10 |

Test-3: Alkalinity by Content of Na$_2$CO$_3$ Impurity in the Forms of SNI

In one embodiment, an alkalinity content of all forms Sodium nitrite in Table 1 was tested using a following method:
  (a) Reagents used: 0.1 N H$_2$SO$_4$ Solution; 0.1 N H$_2$SO$_4$ is prepared by mixing 2.82 ml. of pure Sulphuric acid in water and dilute to 1000 ml by distilled water, standardize it.
  (b) 0.1% w/v Phenolphthalein indicator solution: Dissolve 0.1 gm of Phenolphthalein powder in 80 ml of 95% methanol and finally dilute to 100 ml with distilled water.

Protocol Followed:

Weigh accurately nearest to 25 gm of sample and transfer it to 250 ml conical flask. Add 50 ml of distilled water and boil it for five minutes, Cool it, and add 4 to 5 drops of Phenolphthalein Indicator. Titrate against 0.1 N Sulphuric acid till pink colour to colourless end point. Note the burette reading (BR).

% of content of Na2CO3 impurity in the forms of SNI in the dry of sodium nitrite test sample was calculated as below:

$$\% \ w/w \ \text{alkalinity as sodium carbonate} = \frac{BR \times 2 \times \text{Normality of H2SO4} \times 53 \times 100}{\text{Gram sample} \times 1000}$$

Test-4: Impurity Content of Chloride as Cl

In one embodiment, a chloride content of all forms Sodium nitrite in Table 1 was tested using a following method:

Reagents Used:
  (a) Nitric acid pure (70% w/w)
  (b) Standard Silver Nitrate solution—0.1 N: Dissolve 17 gm Silver Nitrate pure in DM water and dilute to 1000 ml in volumetric flask and Standardise it.
  (c) Nitrobenzene pure
  (d) Standard Ammonium thiocyanate solution—0.1 N: Dissolve of 7.6 gm Ammonium thiocyanate pure in 400 ml of DM water and dilute to 1000 ml in volumetric flask and standardize it.
  (e) Ferric Ammonium Sulphate indicator saturated solution: Dissolve Ferric Ammonium Sulphate pure in DM water up to saturated solution.

Protocol Followed:

Weigh accurately nearest to 10 gm of sample (Suitable quantity) in 250 ml conical flask. Add about suitable quantity of Nitric acid depending as product to be analysis till removal of Nitrous gas. Add 10 ml of 0.1 N Silver Nitrate solutions. Add 5.0 ml Nitrobenzene and shake vigorously. Titrate it against 0.1 N Ammonium Thiocyanate solutions, using 1 ml Ferric Ammonium Sulphate indicator solution. Note the burette reading (BR). End point will be faint brown in colour.

% of content of Chloride (Cl) impurity in the forms of SNI in the dry of sodium nitrite test sample was calculated as below:

$$\% \ w/w \ \text{alkalinity as Chloride as Cl} = \frac{35.5 \times [(\text{N of AgNO3} \times 10) - (BR \times \text{NH4SCN})] \times 100}{\text{Gram sample} \times 1000}$$

Test-5: Impurity Content of Sodium Nitrate

In one embodiment, an impurity content of sodium nitrate of all forms Sodium nitrite in Table 1 was tested using a following method:

Reagents Required:
  (a) Phenol Sulphonic acid reagent: Take 24 gm Phenol in Conical flask, add 12 ml distilled water, add 150 ml AR grade Con·H2SO4. Heat it on water bath for two to three hours and store in umber colour glass bottle.
  (b) Standard NaNO$_3$ solution (1 m=0.1 mg NaNO$_3$): Take 1.0 gm NaNO$_3$ AR grade diluted to 1000 ml distilled water. This will be 1 ml=1 mg NaNO$_3$. Further Take 25 ml of this solution & dilute it to 250 ml with distilled water. This will be 1 ml=0.1 mg NaNO$_3$ Standard solution.
  (c) Liquid NH3 AR Grade (23% w/w)
  (d) Hydroxylamine Sulphate pure Protocol Followed:
  (A) Sample Preparation: Take 0.2 gm dry sample; add 0.70 gm AR grade Hydroxyl Amine Sulphate slowly as reaction is vigorous. Put in on water bath in fuming cupboard. After complete evaporation to dryness, (During evaporation to dryness, no other analysis is to be carried out along with this test in the same fuming cupboard). Cool it at room temperature. Add 2 ml Phenol Sulphonic acid reagent, moisten the residue by rotating the dish carefully, put it on water bath for 15 minutes, and cool it at room temperature. Transfer in 100 ml volumetric flask with cooling condition (use Ice batch) by distilled water, add 5 ml Liquid NH3 solution slowly with cooling till yellow colour observed, (NH3 solution should be added till alkaline), dilute it to 100 ml by distilled water. Prepare reagent blank without sample. Set the zero by reagent blank at 410 nm in the Spectrophotometer. Now take the absorbance of sample solution at 410 nm using 1 cm glass cell.
  (B) For standard NaNO$_3$: Take 10 ml 1 ml=0.1 mg·NaNO$_3$ solution in Glass evaporating dish. Put it on water bath for evaporating to dryness, (During evaporation to dryness no other analysis is to be carried out along with this test in the same fuming cupboard). Cool it at room temperature. Add 2 ml Phenol Sulphonic acid reagent, moisten the residue by rotating the dish carefully, put it on water bath for 15 minutes, and transfer it to 100 ml in volumetric flask using distilled water under cooling condition (use Ice bath). Add 5 ml $NH_3$ slowly with cooling condition till yellow colour observed, ($NH_3$ solution should be added till alkaline) dilute to 100 ml with water. Prepare reagent blank without sample. Set the zero by reagent blank at 410 nm in the spectrophotometer. Take absorbance at 410 nm using 1 cm glass cell.

% of content of Sodium Nitrate ($NaNO_3$) impurity in the forms of SNI in the dry of sodium nitrite test sample was calculated as below:

$$\% \frac{w}{w} NaNO2 = \frac{\text{Absorbance of Sample} \times 0.1 \times 10 \times 100}{\text{Absorbance of standard NaNO3} \times \text{weigh of sample} \times 1000}$$

Test-6: Impurity Content of Iron as $Fe^{3+}$

In one embodiment, an impurity content of Iron as $Fe^{3+}$ of all forms Sodium nitrite in Table 1 was tested using a following method:

Reagents Used:
 (a) Hydrochloric acid pure 30% w/w
 (b) Sulphuric acid pure 98% w/w
 (c) 10% w/v Sulphuric acid: Take 10 ml Con $H2SO4$ and dilute to 100 ml very carefully by cold DM Water. Add $H2SO4$ slowly In cold D M water.
 (d) 30% w/v Potassium Thiocyanate solution: Dissolve 30 gm of pure Potassium Thiocyanate in D M water and dilute to 100 ml in volumetric flask.
 (e) Standard Iron Solution Dissolve 0.7022 g of ferrous ammonium Sulphate ($Fe(NH_4)_2 SO_4 6H_2O$) in 10 ml of 10% Sulphuric acid. From the Burette add 0.1 N Potassium permanganate solutions till pink colour persists for few seconds. Dilute to 1000 ml in a volumetric flask 01 ml=0.1 mg of Fe). 10 ml of this solution dilute to 100 ml in volumetric flask (1 ml=0.01 mg Fe).

Protocol Followed:

Take 5 gm of the Sample (suitable quantity) in glass evaporating dish and evaporate to dryness it on electric burner. Then cool it. Add 7 ml Sulphuric acid solution. Repeat the evaporation to dry the sample, cool the sample and add 2 ml Conc. HCl, add slight DM water, warm it, shake it, and filter the solution by 42. Filter paper in Nessler cylinder. Add 3 ml 30% Potassium thiocyanate solution, dilute to 50 ml by DM water. A blank experiment is carried out using 2 ml of Conc. HCL and 3 ml of 30% Potassium thiocyanate solution and dilute to 50 ml by DM water. From the micro burette add standard Iron solution (1 ml=0.01 mg Fe) till the red colour matches with the colour produced by sample. Note the matching as Burette reading (BR).

% of content of Iron as $Fe^{3+}$ impurity in the forms of SNI in the dry of sodium nitrite test sample was calculated as below:

$$\text{Iron as Fe } w/w \text{ ppm} = \frac{BR \times 0.01 \times 1000}{\text{gm sample}}$$

Test-7: Impurity Content of Heavy Metal as Pb

In one embodiment, an impurity content of heavy metal Pb of all forms Sodium nitrite in Table 1 was tested using a following method:

Reagents Used:
 (a) Concentrated Hydrochloric acid pure (30% w/w)
 (b) Nitric Acid pure (70% w/w)
 (c) Standard lead solution (1 ml=0.01 mg): Dissolve 1.600 gm Lead Nitrate pure in water and 1 ml of concentrated Nitric acid and make the volume up to 1000 ml mark by D M water. Transfer exactly 10 ml of this solution to a 1000 ml volumetric flask, again dilute with D M water and make up the volume to 1000 ml mark. 1 ml of this solution is equivalent to 0.01 mg of Lead (Pb)
 (d) 6% w/v Dilute Acetic acid solution: Take 6 ml, acetic acid and dilute it to 100 ml by D M water in volumetric flask.
 (e) Hydrogen Sulphide solution: Prepare fresh solution using concentrated Hydrochloric acid and Iron pyrites (Ferrous Sulphide).

Protocol Followed:

Take 10 gm sample (Suitable quantity) in glass dish add 25 ml D M water, dissolve it, add 25 ml concentrated hydrochloric acid and evaporate to dryness on water-bath until the odor of hydrochloric acid is no longer perceptible. Dissolve the residue in 30 ml DM water; transfer it to 100 ml Nessler cylinder. If solution is dark/black, then solution pass through activated carbon (Charcoal powder) & collect the clear colorless solution. In this clear color solution, add 2 ml dil. Acetic acid & pass H2S gas for 1 minutes & dilute 50 ml mark See the dark colour and compare it with standard colour of Lead.

Standard Lead Colour: Take 10 ml, 20 ml & 50 ml of 1 ml=0.01 mg Lead standard solution in different 100 ml Nessler cylinders, add 2 ml dilute acetic acid, add 10 ml Hydrogen Sulfide solution, or pass H2S gas dilute to 50 ml mark. See the dark colour and compare with above dark colour of sample solution. If sample colour is less than the standard colour then sample is passing.

% of content of Lead as Pb impurity in the forms of SNI in the dry of sodium nitrite test sample was calculated as below:

$$\text{Lead as Pb } w/w \text{ ppm} = \frac{BR \times 0.01 \times 1000}{\text{gm sample}}$$

Test-8: Clarity of Solution

In one embodiment, a clarity of sodium nitrate solution of all forms Sodium nitrite in Table 1 was tested using a following method:

Prepare a solution in DM water as per specification concentration. Stir well up to dissolve the product, then warm and cool at room temperature. See the clarity of solution and note the observation.

Example 2

In this Example 2, an additional metal content analysis in the SNI sample of the present invention was carried out. Table 2 discloses a comparison of the impurity data of the uncoated improved form of purified crystalline SNI and an anti-caking agent coated improved form of purified crystalline SNI obtained by the method as described with the standard grades of SNI in accordance with an embodiment of the present disclosure.

| Sr. No. | Test Parameter | Unit | An uncoated form of SNI in present disclosure Min | An uncoated form of SNI in present disclosure Max | A coated form of SNI in present disclosure Min | A coated form of SNI in present disclosure Max | Test Method |
|---|---|---|---|---|---|---|---|
| 1 | Copper as Cu | ppm | <0.1 | 0.15 | 0.00 | 0.15 | By ICP-OES |
| 2 | Lead as Pb | ppm | 0.0001 | <0.1 | 0.0001 | <0.1 | By ICP-OES |
| 3 | Zinc as Zn | ppm | 0.01 | 0.20 | 0.00 | <0.1 | By ICP-OES |
| 4 | Arsenic as As | ppm | <0.1 | 0.79 | 0.24 | 0.62 | By ICP-OES |
| 5 | Mercury as Hg | ppm | 0.01 | <0.1 | 0.01 | <0.1 | By ICP-OES |
| 6 | Cadmium as Cd | ppm | 0.01 | <0.1 | 0.01 | <0.1 | By ICP-OES |
| 7 | Potassium as K | ppm | 304 | 374 | 339 | 452 | By ICP-OES |
| 8 | Chromium as Cr | ppm | 0.01 | <0.1 | 0.01 | <0.1 | By ICP-OES |
| 9 | Manganese as Mn | ppm | <0.1 | 0.11 | 0.01 | <0.1 | By ICP-OES |
| 10 | Nickel as Ni | ppm | 0.01 | <0.1 | 0.01 | <0.1 | By ICP-OES |
| 11 | Fluoride as F | ppm | 0.01 | <1 | 0.01 | <1 | By IC |

In accordance with embodiments of the present disclosure, the improved form of purified crystalline sodium nitrite (SNI) described above may have following advantages including but not limited to:

The highly pure sodium nitrite has purity no less than 99%

The highly pure sodium nitrite may be obtained in a specific uniform purified crystalline granule powder obtained by a modified method as described above The modified pure form of sodium nitrite is free of heavy metals such as lead (Pb), Arsenic (As) and Mercury (Hg).

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated but is to be accorded the widest scope consistent with the principles and features described herein. The foregoing description shall be interpreted as illustrative and not in any limiting sense. A person of ordinary skill in the art would understand that certain modifications could come within the scope of this disclosure. The embodiments, examples and alternatives of the preceding paragraphs or the description and drawings, including any of their various aspects or respective individual features, may be taken independently or in any combination. Features described in connection with one embodiment are applicable to all embodiments unless such features are incompatible.

The invention claimed is:

1. A purified crystalline form of sodium nitrite comprising:
a content of sodium nitrite between 99% to 99.2%;
an amount of sodium nitrate is no greater than 0.7% by weight, wherein a water content is no greater than about 0.5% by weight, wherein a heavy metal content is no greater than about 15 ppm, wherein a chloride content is no greater than about 0.05%, wherein a sulfate content is no greater than about 0.05%, wherein an iron content is no greater than about 0.002%, wherein a content of lead is no greater than 0.0001 ppm, wherein a content of Arsenic is no greater than 0.9 ppm, wherein a content of potassium is no greater than about 500 ppm, wherein a content of mercury is no greater than 0.0001 ppm, and wherein an amount of an anti-caking agent is no less than 0.05% and no greater than 0.1%.

2. The form of sodium nitrite as claimed in claim 1, wherein the form of sodium nitrite is free of heavy metals such as Mercury (Hg), Arsenic (As), and lead (Pb).

3. The form of sodium nitrite as claimed in claim 1, wherein an amount of chloride ion impurity is no more than 0.0092%.

4. The form of sodium nitrite as claimed in claim 1, wherein an amount of ferric ion impurity is no more than 0.001%.

5. The form of sodium nitrite as claimed in claim 1, wherein an amount of sulphate ion impurity is no more than 0.032% by weight, and an amount of Fluoride impurity is no more than 1 ppm.

6. The form of sodium nitrite as claimed in claim 1, wherein an amount of sodium carbonate impurity is no greater than 0.1%.

7. The form of sodium nitrite as claimed in claim 1, wherein a shape of a sodium nitrite crystal is an optimized crystal granule form, wherein the height of the optimized crystal granule form of SNI is between 5 to 6 mm.

8. The form of sodium nitrite as claimed in claim 1, wherein a shape of the sodium nitrite crystal is the optimized crystal granule form, wherein the width of the optimized crystal granule form of SNI is between 7 to 8 mm.

9. The form of sodium nitrite as claimed in claim 1, wherein a content of Copper is no greater than 0.15 ppm, a content of Zinc is no greater than 0.2, a content of cadmium is no greater than 0.1 ppm, a content of chromium is no greater than 0.1 ppm, a content of chromium is no greater than 0.1 ppm, a content of Manganese is no greater than 0.11 ppm, and a content of Nickel is no greater than 0.1 ppm.

* * * * *